(12) United States Patent
Antony et al.

(10) Patent No.: US 8,595,837 B2
(45) Date of Patent: Nov. 26, 2013

(54) SECURITY EVENT MANAGEMENT APPARATUS, SYSTEMS, AND METHODS

(75) Inventors: John Melvin Antony, Herndon, VA (US); Paul Apostolescu, Ashburn, VA (US); Pattabiraman Srinivasan, North Potomac, MD (US); Prathap Adusumilli, Herndon, VA (US)

(73) Assignee: Novell, Inc., Provo, UT (US)

( * ) Notice: Subject to any disclaimer, the term of this patent is extended or adjusted under 35 U.S.C. 154(b) by 81 days.

(21) Appl. No.: 13/220,377

(22) Filed: Aug. 29, 2011

(65) Prior Publication Data

US 2013/0055385 A1 Feb. 28, 2013

(51) Int. Cl.
*G06F 11/00* (2006.01)
*G06F 21/00* (2013.01)
*G06F 15/16* (2006.01)

(52) U.S. Cl.
USPC ................................ 726/23; 726/25; 715/736

(58) Field of Classification Search
None
See application file for complete search history.

(56) References Cited

U.S. PATENT DOCUMENTS

| | | | |
|---|---|---|---|
| 7,506,373 B2* | 3/2009 | Morin et al. | 726/23 |
| 7,925,660 B2* | 4/2011 | Dieberger et al. | 707/757 |
| 7,930,752 B2* | 4/2011 | Hertzog et al. | 726/25 |
| 8,185,540 B2* | 5/2012 | Dieberger et al. | 707/757 |
| 2002/0046275 A1* | 4/2002 | Crosbie et al. | 709/224 |
| 2003/0083847 A1* | 5/2003 | Schertz et al. | 702/186 |
| 2005/0216770 A1* | 9/2005 | Rowett et al. | 713/201 |
| 2007/0136603 A1* | 6/2007 | Kuecuekyan | 713/185 |
| 2008/0263663 A1* | 10/2008 | Ide et al. | 726/22 |
| 2010/0162350 A1* | 6/2010 | Jeong et al. | 726/1 |
| 2010/0192195 A1* | 7/2010 | Dunagan et al. | 726/1 |
| 2012/0096551 A1* | 4/2012 | Lee et al. | 726/23 |
| 2012/0137361 A1* | 5/2012 | Yi et al. | 726/22 |

* cited by examiner

*Primary Examiner* — Christopher Revak
(74) *Attorney, Agent, or Firm* — Schwegman Lundberg & Woessner, P.A.

(57) ABSTRACT

Apparatus, systems, and methods may operate to receive multiple security event data streams from a plurality of hardware processing nodes, the multiple security event data streams comprising multiple security events. Additional operations may include extracting multiple security events from multiple security event data streams, and classifying the extracted multiple security events to form domain-specific, categorized data streams. A hierarchy of statistical data streams may then be generated from the domain-specific, categorized data streams. Additional apparatus, systems, and methods are disclosed.

17 Claims, 4 Drawing Sheets

SECURITY EVENT MANAGEMENT APPARATUS, SYSTEMS, AND METHODS

BACKGROUND

There are been a dramatic rise in investment and interest in the Security Event Management (SEM) space. Fueled by an increasing number of cyber attacks and various compliance regulations, computer and network security practitioners use SEM tools to analyze huge volumes of logged security event data to identify threats in real time. These SEM tools have evolved from mechanism that collect, normalize, store, index and report log data to more intelligent systems that operate using rule-based correlation engines to analyze enriched event data (e.g., using identity injection, asset relevance injection, etc.) in real time to identify potential violations of compliance and security policies. In some cases, a great deal of reliance is placed on these correlation engines to ensure that security policies have not been violated.

SUMMARY

In various embodiments, apparatus, systems, and methods that support security event management are provided. In some cases, operations include receiving multiple security event data streams from a plurality of hardware processing nodes, where one or more of the security event data streams comprise multiple security events. Additional operations include extracting the security events from the data streams, filtering the extracted events, classifying the extracted, filtered security events to form domain-specific, categorized data streams, and generating a hierarchy of statistical data streams from the domain-specific, categorized data streams. Additional embodiments are described, and along with the foregoing examples, will be set forth in detail below.

DETAILED DESCRIPTION

As attacks on computer systems and networks have increased in number and sophistication, SEM tools have changed from merely analyzing data provided by traditional security devices and other low level systems, to performing user, database, and application activity monitoring. These more recent use cases present significant challenges to existing SEM techniques, because at some point there is no feasible way to define all possible conditions that should be evaluated by an embedded rule engine—a fundamental weakness of rule-based systems.

Another challenge is presented by these sequences of monitored events: on the surface, normal and abnormal use can appear to be identical. It may be a change (or regularity) in the statistical metrics along some dimension of these events that warrants investigation. In these cases, traditional signature-based systems fall short in identifying differences between normal and abnormal situations.

SEM anomaly detection engines sometimes rely on statistical data streams to identify statistical metric (e.g., sum, moving average, moving standard deviation, etc.) variations that are maximally different from historical data for some dimension of the data. However, the current state of the art for generating statistical streams in SEM systems is limited to simplistic aggregation of event attributes over a predefined time window. Existing systems do not provide the ability to generate, for example, ad-hoc, higher order, domain-specific statistical streams based on context or learning algorithms. Other approaches suffer from the limitation of categorizing events based purely on event attribute values.

To address some of these issues, among others, SEM systems can be implemented to generate real time, multi-dimensional, high-order statistical streams from incoming security event streams. This can be accomplished in a number of ways, a few of which will be described in the following paragraphs.

Figure 1:
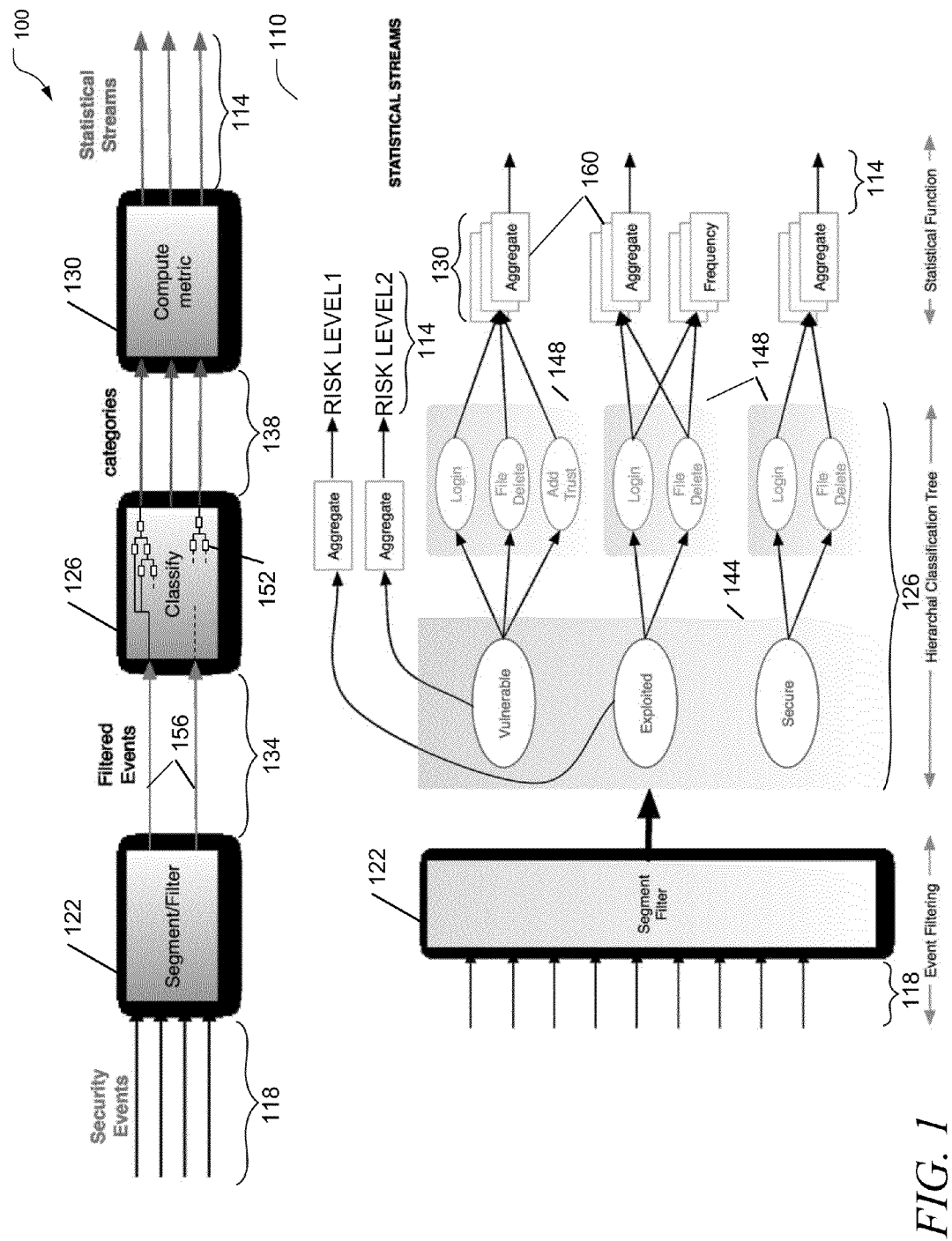
FIG. 1 is a set of system block diagrams that illustrate how categorized statistical event streams are created from security events, according to various embodiments of the invention.

FIG. 1 is a set of system block diagrams 100, 110 that illustrate how categorized statistical event streams 114 are created from incoming streams 118 of security events 118, according to various embodiments of the invention. The streams 118 are acquired, and then processed to generate multi-dimensional, categorized statistical event streams 114 in real time using a combination of filtering (using filters 122), multi-level classifiers 126, and statistical processors 130.

The classifiers 126 may comprise different types of supervised, unsupervised, and semi-supervised classifiers. Classifiers 126 may be context-aware, using external knowledge or inbuilt intelligence to create arbitrary categories. After the streams 118 are filtered to provide streams 134 of filtered events, the classifiers 126 can process the filtered event streams 134 in real time to provide arbitrary categories 138 which are used as dimensions (sometimes known as variables by those of ordinary skill in the art) for which various metrics are calculated by the statistical processors 130 to generate the categorized statistical event streams 114.

For the purposes of this document, a "security event" is any electronic data reception, transmission, or communication activity, or electronic data processing activity that occurs within a monitored network or data processing system environment. Examples of security events include, among others: electronic file activity that is performed within a computer system and logged to a database (e.g., record deletion, modification, etc.), login to an application on a server, and identification of a threat signature on a server. Thus, security event streams can be provided by various log files (which then serve as sources of security events), among others.

For the purposes of this document, the term "domain-specific" used with reference to streams of event data means that the streams can be classified vertically. Examples of domain-specific streams include, among others: streams of events associated with a network domain, classified according to an HTTP (hypertext transport protocol) traffic classifier; or streams of events associated with a role, classified according to responsibility.

Classifiers can be additive. Thus, the HTTP traffic classifier in the previous example may operate to classify events by the HTTP status code at a first level, and at a second level by the HTTP method field. To continue the example, a role classifier might be used at a first level to classify events by the role of the identified person (e.g., user login) responsible for initiating the event, followed by classification at a second level according to the machine on which the event was generated.

Classification can occur in many different ways. For example, classification can be implemented to create hierarchical categories. In this case, each classifier 126 can be realized as a hardware component, or as an algorithm implemented using instructions stored in a non-transitory medium which, when executed, generate a hierarchy of classification categories.

A hierarchy permits viewing deviations within a system or network across multiple levels. For each level within the hierarchy, there may be similar levels of information.

Thus, to note a few examples among many, a domain-specific event stream can be classified according to the responsibility of the actor generating an event (e.g., in the healthcare arena, a physician authorized to view a file; or in the financial systems arena, an administrator authorized to delete a file, etc.). The stream can also be classified according to the legal status of an actor, such as whether the actor is a child or adult. The stream can also be classified by the status of the actor within a particular system, such as a hospital, where actor status may include: patient, hospital staff, physician, etc. Classification categories may also include the type of action associated with an event (e.g., file deletion, creation, or modification).

Classification can also occur according to the type of machine used to generate an event (e.g., a secure desktop within an organization versus an unsecured cellular telephone roaming outside of the organizational network). In many embodiments, classification occurs to enable drill-down selection of categories, from broader classes, into narrower sub-classes.

Once classification occurs, statistics may be generated. Examples include, among others: volume (e.g., discrete events per unit time, such as the number of logins per hour into the web server—an abnormally large number might be cause for concern, unless the computer is a sales computer, and the measurement time includes a holiday sale period), frequency (e.g., different types of discrete events per unit time, such as when financial server A normally connects to financial server B, but recently financial server A has been observed connecting to 500 unique servers—none of which is server B).

Both external knowledge and inbuilt intelligence can be used to create an arbitrary category using a context-aware classifier. "External knowledge" refers to the lookup of contextual information (e.g., in a table) along a specific dimension to generate a category. The context is used to generate a classification. For example, this can occur when a name is looked up to determine the associated responsibility level, which is then used for classification. In the systems 100, 110 a name could be extracted from a security event 118 using the filter 122, and after an employee database was accessed to look up the extracted name, a classifier 126 could be used to classify the name according to the type of employee (e.g., contractor, visitor, employee, etc.). The systems 100, 110 can also learn to classify, by associating employees working in certain departments with certain classes of staff, for example.

One type of statistical stream 114 that may be generated by the systems 100, 110 is a volume-based time series, where the time series is a sequence of numerical data points in successive order that (usually) occur at substantially uniform intervals. A time series can be analyzed to see how a specific variable (dimension) changes over time, or how it changes as compared to another variable. For example, a time series can be analyzed to identify how the volume of secure file accesses changes as the number of attack attempts reported on the asset by an intrusion detection system (IDS) changes. This might be accomplished in real time by generating two time series of statistical streams 114 along two dimensions: critical file access and attacks. This is very simple example of using single-level classifiers 126 and aggregate function modules 142 to generate volume-based time series statistical streams 114 along more than one dimension.

Systems 100, 110 that can be used to generate multi-level, multi-dimensional statistical streams 114 may include multiple functions that operate within a runtime environment. Some of these functions, which drive the transformation from a security event stream to a statistical event stream, include a filtering function (implemented by the filters 122), a classification function (implemented by the classifiers 126), and one or more statistical metric functions (implemented by the processors 130). These functions, which can be combined into pipelines for real time execution, will now be explained in more detail.

The filtering function uses segmentation to isolate selected events from the incoming security event streams 118. The filtering operation implemented by the filter(s) 122 performs continuously to take in one or more streams 118 of security events as input, and produce one or more filtered event streams 134 as output.

The classification function takes in the filtered event streams 134 as input, and generates categories 138 as output. The categories 138 emitted by the classifier(s) 126 depend on the algorithms used to generate the categories 138. The classifiers 126 used to generate categories 138 range from simple rule-based classifiers that use event attributes to classify the filtered event streams 134, to more complex learning classifiers, and supervised/unsupervised classifiers 126. The classifiers 126 may also be context-aware, classifying based on information that is available in addition to the filtered data provided at the input to generate the categories 138. For example, an asset vulnerability classifier 144 could take the number of vulnerabilities and the number of active attempts to attack an asset into account, to categorize events by asset risk level.

Unsupervised classifiers may comprise clustering algorithms that segregate data based on some similarity, or a distance measure (e.g., probabilistic algorithms, where entities are compared regarding their distance to clusters of points). An example would be a comparison along a dimension, such as the type of group, or type of activity based on some dimensions within a single event or a cluster of events (e.g., those that have access to a medical file database are likely a member of a group of doctors). Fully supervised classifiers may rely on labeled data for operation during the learning period, which is then used to classify unlabeled data thereafter (e.g., attributes are used to train the system with respect to classification, based on labels, such as "staff" and "professional"). Semi-supervised classifiers rely mostly, but not exclusively, on labeled data during the training period.

Classifier functions may be combined into a tree to create multilevel hierarchal classifiers. The multi-level hierarchal classifiers may thus comprise a tree of composite classifiers that use the output of the previous level of classifiers to generate input to the next category level. The ability to combine various classifiers in a hierarchical fashion allows dynamic production of domain-specific higher order categories from the classifiers 126.

The statistical metric functions implemented by the processors 130 take the categories 138 emitted by the classifiers 126, and process them to generate various statistical streams 114. Examples of streams 114 that may be generated by the processors 130 include volume-based streams, frequency-based streams, maximum, average and minimum values observed within a selected time window, etc. When used with hierarchical classifiers 126, the statistical metric functions implemented by the processors 130 may be linked to any path within a classification tree to generate streams 114 corresponding to the different levels of classification available within the tree (e.g., a multi-level classification tree 152).

For the purposes of this document, an "asset" is any machine or group of machines that is of value to an enterprise (e.g., a financial server). A "risky" asset is any machine or group of machines that could potentially compromise the security of the enterprise.

An asset can be classified as a "vulnerable" asset when the asset is known to have vulnerabilities, but those vulnerabilities have not been exploited by an attacker. An asset is classified as an "exploited" asset when one or more known vulnerabilities of the asset have been successfully exploited by an attacker. A "secure" asset is one with no known vulnerabilities.

The systems 100, 110 can provide a pluggable framework where the functions described above are combined into processing pipelines to generate the streams 114 in real time. Building processing pipelines that include classification and statistical functions permit creating a practically unlimited number of statistical streams 114 along any desired dimension.

An example of such a system 100, 110 would be one that was built to generate a multi-level time series of streams 114 that are used to indicate user activity with respect to unsecured assets. In this case, the streams 114 would comprise a time series of various activities performed on assets that have been dynamically classified as risky. Here the security events 118 might be filtered to include only those events resulting from user activity, versus system-generated activity (e.g., login versus system database access). The resulting streams 134 could be classified into source vulnerability categories, via the classifier 144: vulnerable, exploited, and secure. Classification could be based on a variety of factors, such as the number of source asset vulnerabilities, the number of attack attempts (e.g., supplied by the IDS that scans network packets looking for attack signatures), the number of attacks on current vulnerabilities (supplied by an advisor), with the output further classified by the kind of activity taking place on each of the previously-generated categories.

Thus, in some embodiments the first level of classification operates to classify filtered events in the streams 134 as originating from either exploited, vulnerable or secure machines. The second level of classification operates to classify the event by the type of activity which generates the event, allowing analysts to identify the kinds of activities occurring on exploited machines, for example.

The systems 100, 110 may thus include one or more processing pipelines 156 comprising one or more segment filters 122, one or more hierarchal classifiers 126, and one or more aggregation functions forming part of the statistical processors 130. The hierarchical classifiers 126 may comprise a contextual asset risk classifier 144 coupled to one or more activity classifiers 148. Multi-level streams 114 can be generated by linking statistical functions to the emitted categories 138 at any level in the classification tree (included in the classifiers 126). In some embodiments, the streams 138 can be aggregated by the processors 130 to provide volume-based or frequency-based streams 114.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments that can be realized.

Figure 2:
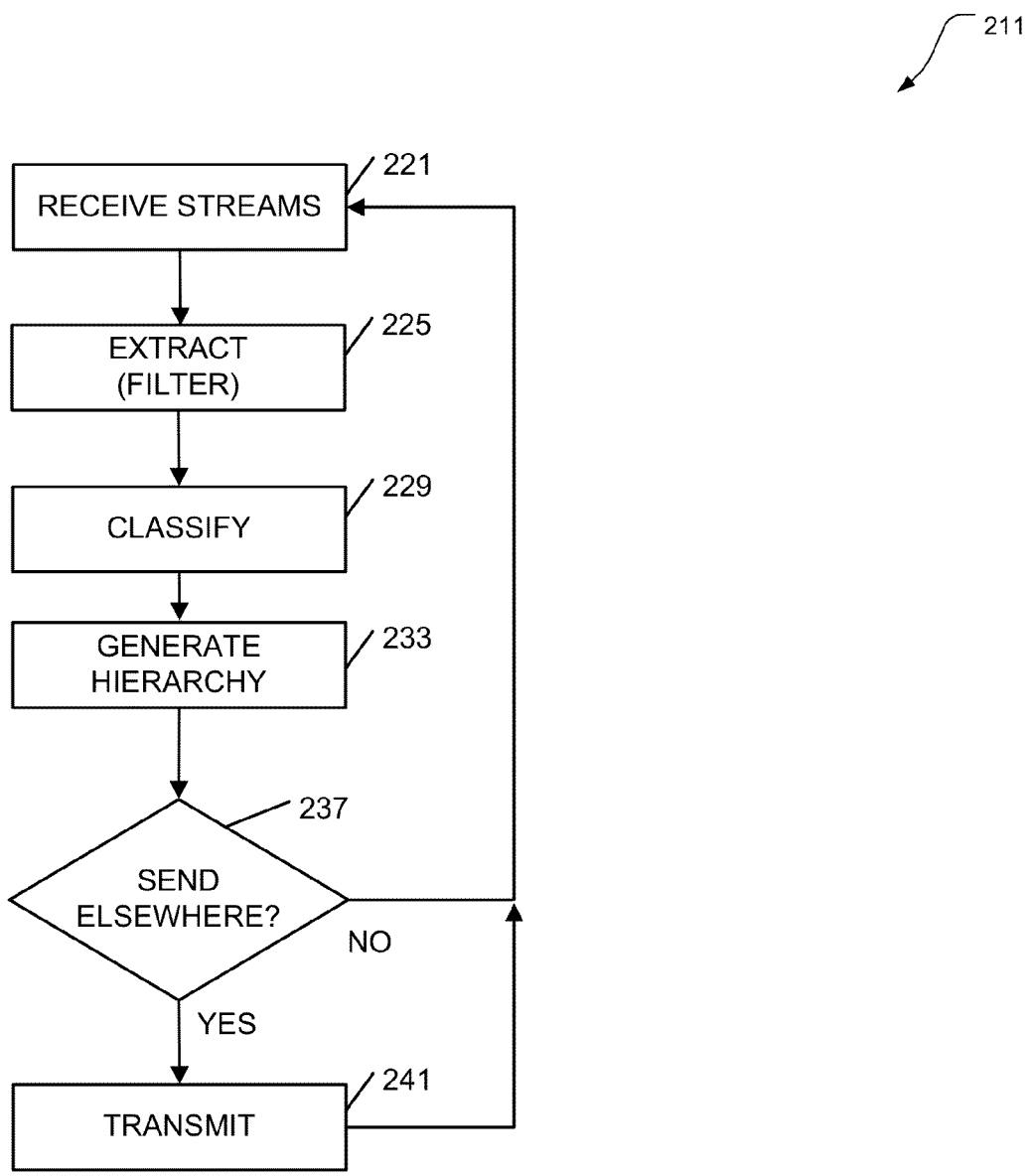
FIG. 2 is a flow diagram illustrating methods of operation according to various embodiments of the invention.

For example, FIG. 2 is a flow diagram illustrating methods 211 of operation according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when executed by a specific machine, operate to perform the processing depicted in FIGS. 1 and 2.

Thus, referring now to FIG. 2, it can be seen that a processor-implemented method 211 of security event management may include receiving security event data streams, and generating a hierarchy of statistical data streams from derived, classified streams of the security events. The method 211 may begin at block 221 with receiving multiple security event data streams from a plurality of hardware processing nodes, the multiple security event data streams comprising multiple security events.

Individual devices, including computing and/or communications devices (e.g., cellular phones, terminals, tablets, computers, etc.) can function as hardware processing nodes, and serve as a source of security event data. By extension, log files of events associated with such devices can also serve as a source of security event data. Thus, the activity at block 221 may comprise receiving at least one of the security event data streams in response to accessing a log file stored on one of the hardware processing nodes.

The method 211 may continue on to block 225 to include extracting multiple security events from multiple security event data streams. The activity at block 225 may include filtering the incoming security event data streams to provide filtered event data streams.

A process of classification can be used to segregate the security events, whether filtered or not, according to categories. Thus, the method 211 may continue on to block 229 to include classifying the (extracted, and perhaps filtered) multiple security events to form domain-specific, categorized data streams.

Source vulnerability categories can be used to classify security events. Thus, the activity at block 229 may include classifying the multiple security events according to vulnerability categories associated with sources of the security event data streams.

A sequential hierarchy of classification can be used. Some embodiments may provide parallel classification as well. Thus, the activity at block 229 may include classifying the multiple security events using a sequential hierarchy of classifier functions. In some cases, output from a first level of the classifier functions in the hierarchy provides input to a second level of the classifier functions in the hierarchy.

Information provided by a database may serve to provide context-aware classification. Thus, the activity at block 229 may comprise accessing a database stored on a non-transitory storage medium, and receiving information as external knowledge from the database to provide context-aware classification of the extracted multiple security events.

A tree of classifiers may be used to categorize security event data. Thus, the activity at block 229 may use a combination of classifier functions comprising a tree of multilevel, hierarchical classifiers.

Security event categories can be used to determine the structure of the statistical data stream hierarchy. Thus, the categories associated with the categorized data streams may be used to define at least some levels in the hierarchy.

The method 211 may thus continue on to block 233 to include generating a hierarchy of statistical data streams from domain-specific, categorized data streams derived from the multiple security events. The generation process may be continuous, so that reception and generation occur substantially simultaneously. Thus, the method 211 may comprise receiving some of the multiple security event data streams while generating the hierarchy of the statistical data streams as part of a continuous reception and generation process.

Security event data may be classified along multiple dimensions, such as events resulting from actions by a member of a particular group, or due to a particular type of activity. Thus, the generated statistical data streams may comprise multiple dimensions.

The statistical data streams may take many forms, including volume-based streams (e.g., indicating the number of times the same activity is repeated over a given time interval), and frequency-based streams (e.g., indicating the number of different activities that occur over a given time interval). Thus, the activity at block 233 may comprise generating the statistical data streams to include at least one of a volume-based stream or a frequency-based stream.

The activities within the systems or processes described herein can operate on and/or generate aggregated pipelines of data. Thus, at least one of the activities of extracting (at block 225), classifying (at block 229), or generating (at block 233) may be accomplished using input/output aggregation pipelines (e.g., see FIG. 1, system 110). Classification of incoming streams, and generation of statistical streams, may occur at any and every level in a hierarchy of levels.

The generated statistical data streams may be sent elsewhere for additional processing and/or display. Thus, the method 211 may include, at block 237, evaluating whether the generated streams are to be sent elsewhere. If not, then the method 211 may continue on to block 221. If so, then the method 211 may continue on to block 241 to include transmitting at least some of the statistical data streams to another location, such as to a network interface in a client node coupled to a display.

The methods described herein do not have to be executed in the order described, or in any particular order. Moreover, various activities described with respect to the methods identified herein can be executed in repetitive, serial, or parallel fashion. The individual activities illustrated using FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The activities shown in FIGS. 1 and 2 can be implemented in various devices, as well as in a computer-readable storage medium, where the methods are adapted to be executed by one or more processors. Further details of such embodiments will now be described.

Figure 3:
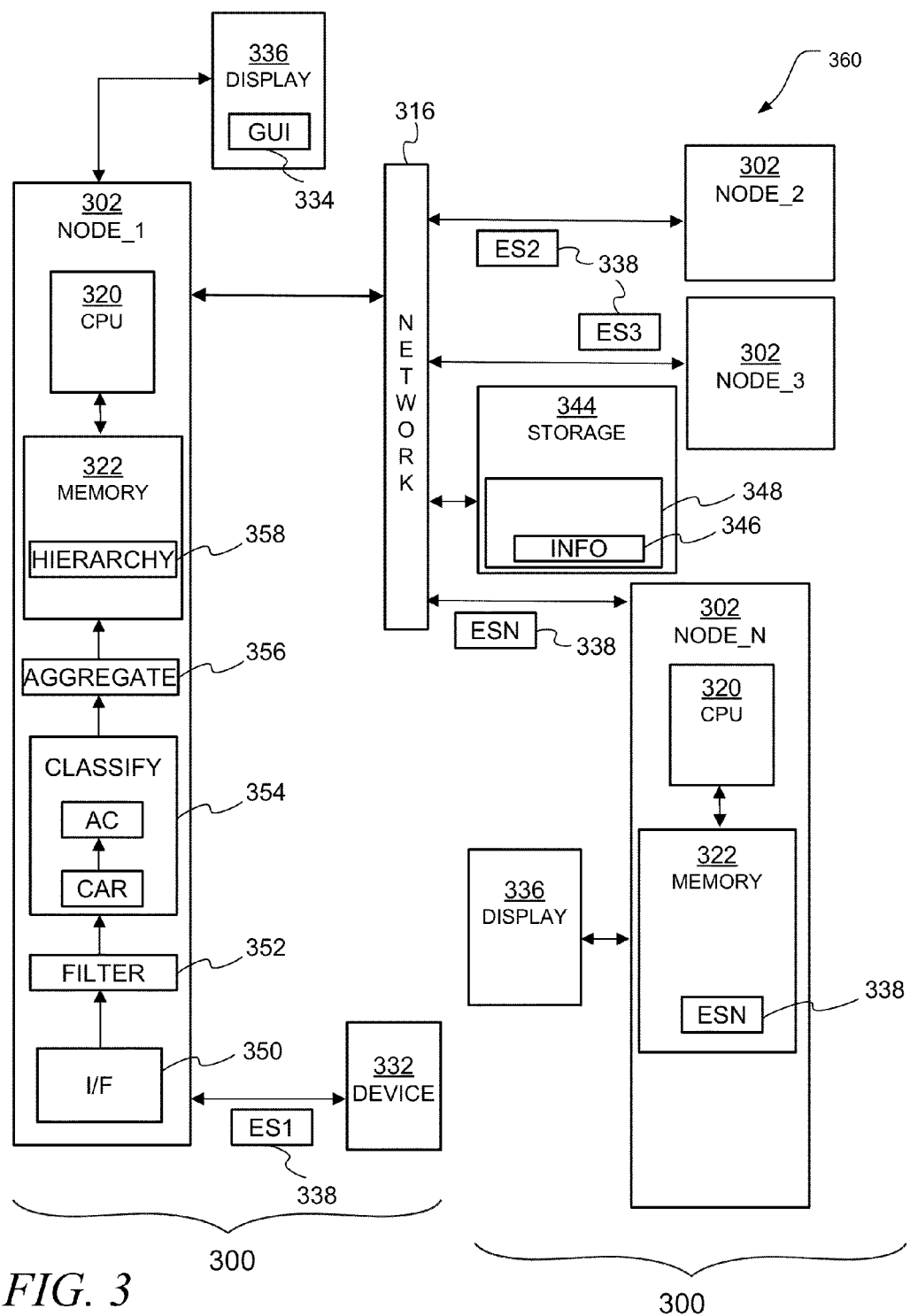
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to provide security event management may comprise one or more processing nodes 302, one or more processors 320, multiple memories 322, and/or displays 336. Each apparatus 300 may comprise a client, a server, or some other networked processing node.

The processing nodes 302 may comprise physical machines or virtual machines, or a mixture of both. The nodes 302 may also comprise networked entities, such as servers and/or clients. In some basic implementations, the operations described can occur entirely within a single node 302. The apparatus 300 may thus comprise a single desktop computer or server, for example, or a number of networked nodes 302.

In some embodiments, then, an apparatus 300 may comprise a plurality of nodes 302 having one or more processors 320 and one or more interfaces 350, including a bus or a network (wired or wireless) interface. The interfaces 350 may operate to receive multiple security event data streams ES1, ES2, . . . , ESN from a plurality of hardware processing nodes 302, the multiple security event data streams ES1, ES2, . . . , ESN comprising multiple security events.

The nodes 302 may comprise one or more filters 352 to filter the received streams ES1, ES2, . . . , ESN. The processor(s) 320 may be used to generate a hierarchy 358 of statistical data streams from domain-specific, categorized data streams derived from the multiple security events, or streams of filtered security events.

The apparatus 300 may include a GUI 334 to receive the generated statistical data streams. Thus, the apparatus 300 may comprise a GUI executed by a client node (e.g., NODE_1) to receive the statistical data streams.

Sources of security event data can be servers, clients, storage nodes, etc. Thus, the hardware processing nodes 302 may comprise server nodes, client nodes, or storage nodes, or any combination of these.

Security event data can even be received from within the same node at which processing occurs, providing a form of self-monitoring. Thus, the processor(s) 320 in a node 302 (e.g., NODE_1) may be used to provide the processing described herein, while simultaneously serving as a source of security events (along with one or more devices 332 coupled to the node, for example).

A hardware, firmware, or software classifier module may be included in the system. Thus, the apparatus 300 may comprise a classifier module 354, such as a hierarchical classifier module, coupled to a memory 322 to store classification algorithms (e.g., algorithms implemented by a contextual asset risk classifier CAR having an output coupled to an input of an activity classifier AC) to operate on the multiple security event streams ES1, ES2, . . . , ESN, to provide the hierarchy 358 of domain-specific categorized data streams.

One or more user input devices (e.g., a tablet computer, a workstation, a cellular telephone, etc.) 332 may operate as a client node, or simply as a source of security events, coupled to another node 302.

In some embodiments, the apparatus 300 comprises one or more storage devices 344. The storage devices 344 may comprise volatile memory, non-volatile memory, or a combination of the two, making up a non-transitory storage medium 348. The medium 348 may be used to store a variety of information 346, such as external knowledge received from a database to provide context-aware classification of security events.

A system 360 that operates to manage security events may comprise multiple instances of the apparatus 300. The system 360 might also comprise a cluster of nodes 302, including physical and virtual nodes. It should be noted that any of the nodes 302 may include any one or more of the elements explicitly shown in nodes NODE_1, NODE_2, NODE_3, . . . , NODE_N, in any combination.

The nodes 302 may exist as a device embedded within another structure (e.g., as an embedded device), or as a regular desktop or laptop computer that includes a display 336 to show the activities conducted while nodes 302 are active. Thus, the apparatus 300 may also comprise a display 336 coupled to the nodes 302 to display visible indications of the activities conducted (e.g., receiving event stream ES1) by the nodes 302.

The apparatus 300 and system 360 may be implemented in a machine-accessible and readable medium that is operational over one or more networks 316. The networks 316 may be wired, wireless, or a combination of wired and wireless. The apparatus 300 and system can be used to implement, among other things, the processing associated with the activities illustrated in FIGS. 1 and 2, respectively. Modules may comprise hardware, software, and firmware, or any combination of these. Additional embodiments may be realized.

Figure 4:
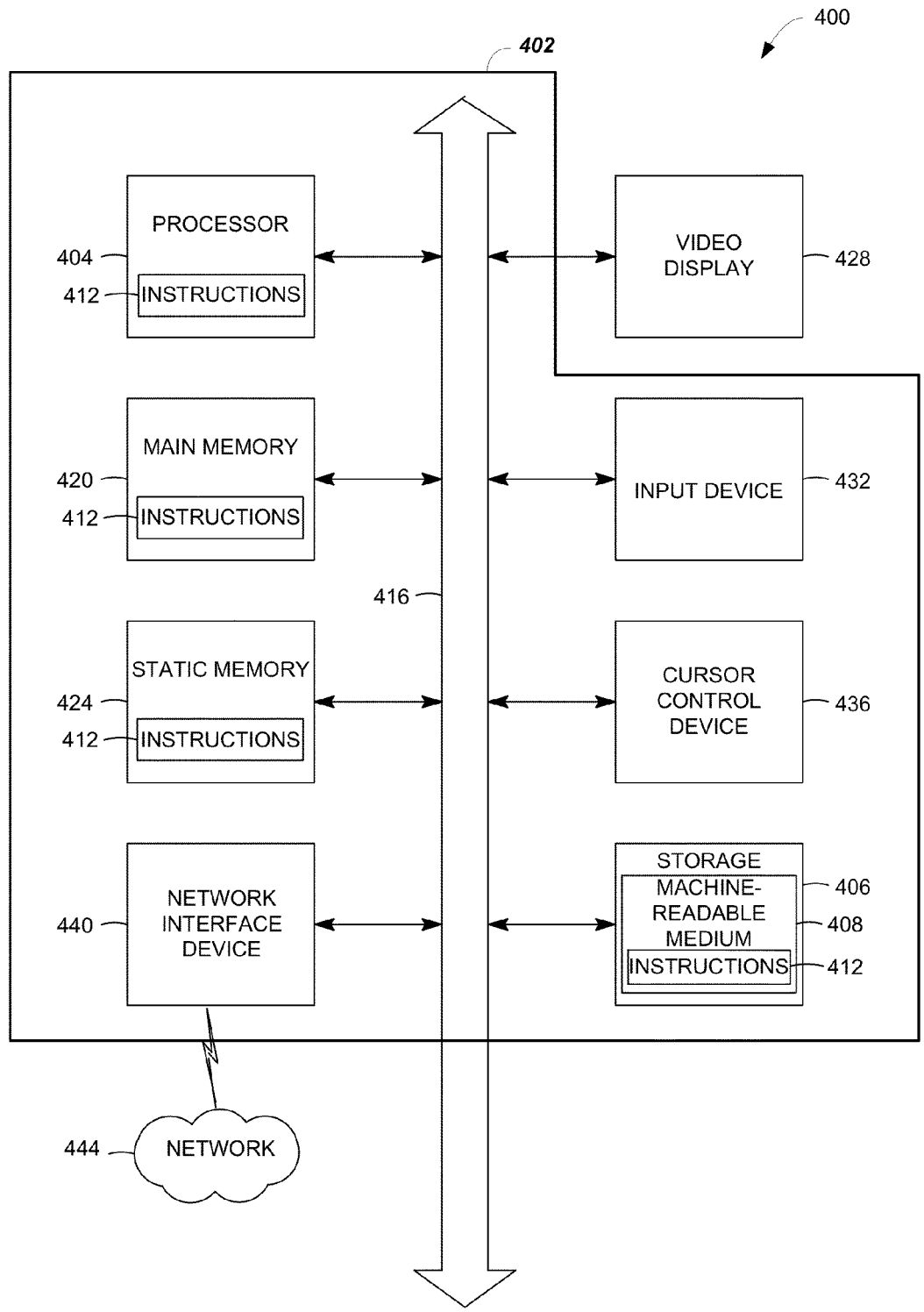
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any tangible, non-transitory memory including an electrical, optical, or electromagnetic conductor) having instructions 412 stored thereon (e.g., computer program instructions), which when executed by the one or more processors 404 result in the machine 402 performing any of the actions described with respect to the methods outlined above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database), and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the various embodiments, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide new options for managing security events. For example, various embodiments may operate to provide processing pipelines that include classifiers and metric calculation functions to create high-order, domain-specific statistical streams along any number of dimensions. These statistical streams can then be used to enable sophisticated anomaly detection functionality in SEM products. Features may include contextual, learning, and hierarchical classifier trees to generate high-order, domain-specific statistical streams in real time. Improved system and network security, along with increased user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
an interface to receive multiple security event data streams from a plurality of hardware processing nodes, the multiple security event data streams comprising multiple security events;
a hierarchical classifier module coupled to a memory to store classification algorithms to operate on the multiple security events to provide a tree of domain-specific, categorized data streams according to arbitrary categories that are created using at least one of external knowledge or inbuilt intelligence, the arbitrary categories being dimensions; and
at least one processor to generate a hierarchy of statistical data streams from the dimensions, the statistical data streams being linked to a plurality of paths within the tree, the paths corresponding to different levels of classification.

2. The system of claim 1, further comprising:
a graphical user interface (GUI) executed by a client node to receive the statistical data streams.

3. The system of claim 1, wherein the hardware processing nodes comprise at least one of server nodes, client nodes, or storage nodes.

4. The system of claim 1, wherein the at least one processor is housed together with at least one of the hardware processing nodes.

5. The system of claim 1, wherein the hierarchical classifier module further comprises:
a contextual asset classifier having an output coupled to an input of an activity classifier.

6. A processor-implemented method to execute on one or more processors that perform the method, comprising:
receiving multiple security event data streams from a plurality of hardware processing nodes, the multiple security event data streams comprising multiple security events;
classifying the multiple security events to form a tree of domain-specific, categorized data streams according to arbitrary categories that are created using at least one of external knowledge or inbuilt intelligence, the arbitrary categories being dimensions; and
generating a hierarchy of statistical data streams from the dimensions, including linking the statistical data streams to a plurality of paths within the tree, the paths corresponding to different levels of classification.

7. The method of claim 6, wherein the receiving further comprises:
receiving at least one of the security event data streams in response to accessing a log file stored on one of the hardware processing nodes.

8. The method of claim 6, wherein the classifying further comprises:
classifying the multiple security events according to vulnerability categories associate with sources of the security event data streams.

9. The method of claim 6, wherein the classifying further comprises:
classifying the multiple security events using a sequential hierarchy of classifier functions, wherein output from a first level of the classifier functions in the hierarchy provides input to a second level of the classifier functions in the hierarchy.

10. The method of claim 6, further comprising:
receiving some of the multiple security event data streams while generating the hierarchy of the statistical data streams as part of a continuous reception and generation process.

11. The method of claim 6, wherein the statistical data streams comprise multiple dimensions.

12. A processor-implemented method to execute on one or more processors that perform the method, comprising:
extracting multiple security events from multiple security event data streams;
classifying the extracted multiple security events to form a tree of domain-specific, categorized data streams according to arbitrary categories that are created using at least one of external knowledge or inbuilt intelligence, the arbitrary categories being dimensions; and
generating a hierarchy of statistical data streams from the dimensions, including linking the statistical data streams to a plurality of paths within the tree, the paths corresponding to different levels of classification.

13. The method of claim 12, further comprising:
transmitting at least some of the statistical data streams to a network interface in a client node coupled to a display.

14. The method of claim 12, wherein using external knowledge the comprises:
accessing a database stored on a non-transitory storage medium; and
receiving information as external knowledge from the database to provide context-aware classification of the extracted multiple security events.

15. The method of claim 12, wherein the classifying uses a combination of classifier functions comprising a tree of multilevel, hierarchical classifiers.

16. The method of claim 12, wherein the generating comprises:
generating the statistical data streams to include at least one of a volume-based stream or a frequency-based stream.

17. The method of claim 12, wherein at least one of the extracting, the classifying, or the generating are accomplished using input/output aggregation pipelines.

* * * * *

UNITED STATES PATENT AND TRADEMARK OFFICE
CERTIFICATE OF CORRECTION

PATENT NO.        : 8,595,837 B2
APPLICATION NO.   : 13/220377
DATED             : November 26, 2013
INVENTOR(S)       : Antony et al.

Page 1 of 1

It is certified that error appears in the above-identified patent and that said Letters Patent is hereby corrected as shown below:

In the Claims

In column 11, line 47, in Claim 5, after "asset", insert --risk--, therefor

In column 12, line 11, in Claim 8, delete "associate" and insert --associated--, therefor In column 12, line 44, in Claim 14, after "knowledge", delete "the", therefor Signed and Sealed this
Twenty-second Day of April, 2014

Michelle K. Lee
*Deputy Director of the United States Patent and Trademark Office*